US007205730B2

(12) United States Patent
Taguchi

(10) Patent No.: US 7,205,730 B2
(45) Date of Patent: Apr. 17, 2007

(54) ARTICLE TRANSPORT VEHICLE

(75) Inventor: Kazuhiro Taguchi, Aichi-ken (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 11/221,398

(22) Filed: Sep. 6, 2005

(65) Prior Publication Data

US 2006/0049783 A1 Mar. 9, 2006

(30) Foreign Application Priority Data

Sep. 8, 2004 (JP) ............................ 2004-261349

(51) Int. Cl.
*H02P 5/46* (2006.01)

(52) U.S. Cl. ............................ 318/69; 318/68; 318/50; 318/45; 318/9; 318/8

(58) Field of Classification Search ................ 180/218, 180/220, 224
See application file for complete search history.

(56) References Cited

U.S. PATENT DOCUMENTS 3,431,994 A * 3/1969 Wood, Jr. ................... 180/220
3,841,428 A * 10/1974 Bialek ....................... 180/65.2
3,915,250 A * 10/1975 Laden et al. ................ 180/220
4,207,821 A * 6/1980 Beckert ...................... 104/119
4,252,217 A * 2/1981 Benjamin ................... 414/592
4,290,000 A * 9/1981 Sun ............................ 318/566
4,293,052 A * 10/1981 Daswick et al. ............ 180/219
4,327,313 A * 4/1982 Tsuboi et al. ................. 318/52
4,345,662 A * 8/1982 Deplante .................... 180/168
4,357,893 A * 11/1982 Frye ........................... 114/288
4,480,157 A * 10/1984 Ishikura et al. ............... 191/34
4,509,685 A * 4/1985 Harvey ....................... 239/745
4,733,742 A * 3/1988 Frye ........................... 180/223
4,756,657 A * 7/1988 Kinney ....................... 414/281
4,776,282 A * 10/1988 Ishikura et al. ............. 104/109
4,922,831 A * 5/1990 Ziegenfus et al. .......... 104/166
4,991,516 A * 2/1991 Rixen et al. ........... 104/130.09
5,078,227 A * 1/1992 Becker ....................... 180/221

(Continued)

FOREIGN PATENT DOCUMENTS

JP 07187320 A * 7/1995

(Continued)

*Primary Examiner*—Lincoln Donovan
*Assistant Examiner*—Robert W. Horn
(74) *Attorney, Agent, or Firm*—The Webb Law Firm

(57) ABSTRACT

The invention provides an article transport vehicle that includes: a vehicle body; a first wheel that supports the vehicle body; a second wheel that is disposed spaced apart from the first wheel in a fore-and-aft direction, and that supports the vehicle body; a first drive motor capable of driving the first wheel; a second drive motor capable of driving the first wheel; velocity sensor for obtaining information necessary for obtaining a velocity of the vehicle body; and controller for controlling the first and the second drive motors, wherein the controller performs a first travel velocity control with respect to the first drive motor so as to control the first drive motor based on a difference between a target travel velocity and a travel velocity based on a detection by the velocity sensor, and performs a first conflict suppress control with respect to the second drive motor so as to control the second drive motor to reduce conflict with driving of the first wheel by the first travel velocity control.

20 Claims, 8 Drawing Sheets

U.S. PATENT DOCUMENTS 5,134,346 A * 7/1992 Schneider et al. ............. 318/8
5,134,940 A * 8/1992 Fujita et al. ................ 104/139
5,409,074 A * 4/1995 Wilson et al. ............... 180/6.5
5,410,234 A * 4/1995 Shibata et al. .............. 318/700
5,434,486 A * 7/1995 Tanaka ........................ 318/69
5,491,390 A * 2/1996 McGreen ....................... 318/5
5,556,117 A * 9/1996 Szeremeta ............... 280/47.11
5,580,206 A * 12/1996 Redelman et al. .......... 414/282
5,646,495 A * 7/1997 Toyozawa et al. .......... 318/625
5,655,870 A * 8/1997 Yasuhara et al. ........... 414/273
5,671,821 A * 9/1997 McGreen .................... 180/220
5,731,672 A * 3/1998 Miyaguchi .................. 318/293
5,735,363 A * 4/1998 Horovitz et al. ............ 180/205
5,775,452 A * 7/1998 Patmont ..................... 180/181
5,865,267 A * 2/1999 Mayer et al. ............... 180/205
6,046,566 A * 4/2000 Sonoda et al. .............. 318/625
6,065,557 A * 5/2000 von Keyserling ........... 180/221
6,222,333 B1 * 4/2001 Garnett et al. .............. 318/254
6,260,649 B1 * 7/2001 Carney, Jr. .................. 180/220
6,290,188 B1 * 9/2001 Bassett ................... 246/182 R
6,384,561 B1 * 5/2002 Niizuma et al. ............ 318/625
6,443,264 B2 * 9/2002 Nakashima et al. ........ 187/249
6,534,944 B2 * 3/2003 Toyozawa et al. .......... 318/625
6,543,564 B1 * 4/2003 Kamen et al. ........... 180/89.13
6,592,080 B2 * 7/2003 Murata et al. .............. 246/1 C
6,755,265 B2 * 6/2004 Huntsberger et al. ...... 180/65.1
6,759,818 B2 * 7/2004 Oyori .......................... 318/34
6,823,235 B2 * 11/2004 Toyozawa et al. .......... 700/193
6,858,999 B2 * 2/2005 Kujihashi ...................... 318/6
6,874,591 B2 * 4/2005 Morrell et al. .............. 180/179
6,914,410 B2 * 7/2005 Morgante et al. ........... 318/801
6,929,080 B2 * 8/2005 Kamen et al. ........... 180/89.14
6,984,948 B2 * 1/2006 Nakata et al. .............. 318/254
6,994,179 B2 * 2/2006 Huntsberger et al. ...... 180/65.3
7,005,826 B2 * 2/2006 Dirsch et al. ............... 318/727
7,017,713 B2 * 3/2006 Tai ............................. 187/244
2002/0005334 A1 * 1/2002 Matsumoto et al. ..... 198/678.1
2002/0017433 A1 * 2/2002 Nakashima et al. ........ 187/249
2002/0108842 A1 * 8/2002 Bonora et al. ........... 198/836.1
2002/0148656 A1 * 10/2002 Li .............................. 180/6.2
2003/0015976 A1 * 1/2003 Chen ............................. 318/9
2003/0216835 A1 * 11/2003 Wakui ........................ 700/245
2004/0042887 A1 * 3/2004 Tai et al. .................... 414/631
2004/0052624 A1 * 3/2004 Miyano et al. ............. 414/498
2004/0055796 A1 * 3/2004 Kamen et al. ................ 180/21
2004/0065495 A1 * 4/2004 Huang ........................ 180/220
2004/0107862 A1 * 6/2004 Suh ............................ 104/91
2004/0184901 A1 * 9/2004 Taguchi et al. ............. 414/270
2004/0228709 A1 * 11/2004 Ueda .......................... 414/279
2004/0228710 A1 * 11/2004 Ueda .......................... 414/279
2004/0253087 A1 * 12/2004 Iizuka ........................ 414/626
2004/0265107 A1 * 12/2004 Kim et al. .................. 414/626
2005/0021196 A1 * 1/2005 Moriguchi ................... 701/23
2005/0081736 A1 * 4/2005 Koide ..................... 104/88.01
2005/0090965 A1 * 4/2005 Kamata et al. ............... 701/82
2005/0139114 A1 * 6/2005 Nakao et al. ................. 104/96
2005/0216169 A1 * 9/2005 Arai ............................ 701/96
2006/0017414 A1 * 1/2006 Joe et al. .................... 318/432
2006/0049783 A1 * 3/2006 Taguchi ....................... 318/69
2006/0060106 A1 * 3/2006 Ueda .......................... 105/144

FOREIGN PATENT DOCUMENTS

JP 08202446 A * 8/1996
JP 08324716 A * 12/1996
JP 11193112 A * 7/1999
JP 2000128312 A * 5/2000
JP 2000351412 A * 12/2000
JP 2000351413 A * 12/2000
JP 2001-240213 9/2001
JP 2001240213 A * 9/2001
JP 2002046808 A * 2/2002
JP 2002046809 A * 2/2002
JP 2002362709 A * 12/2002
JP 2003002408 A * 1/2003

* cited by examiner

FIG.9

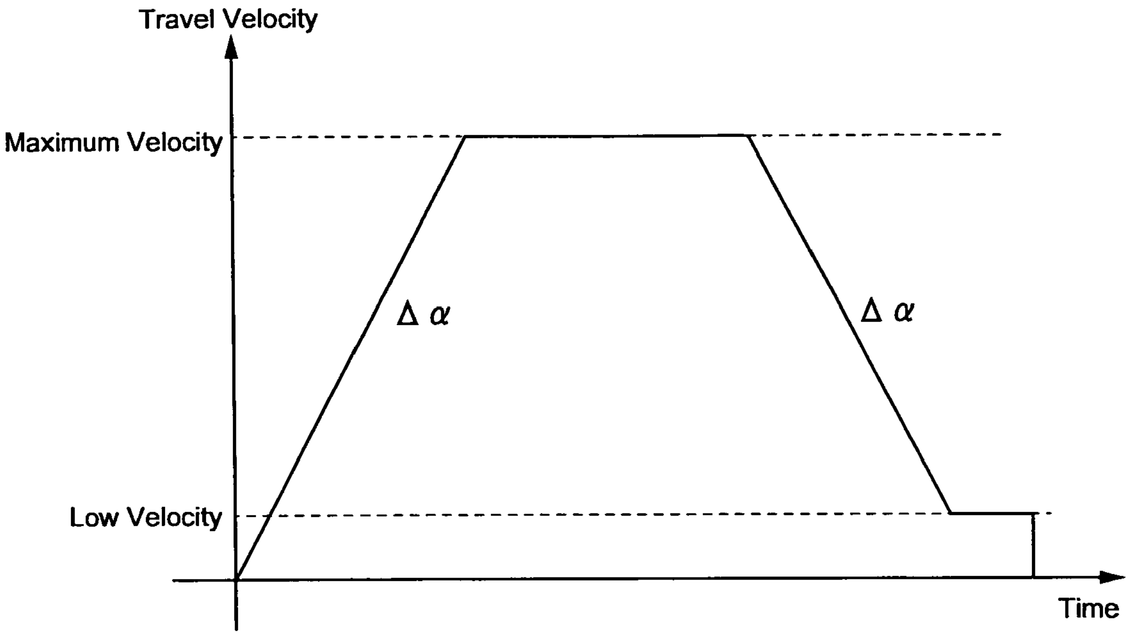

FIG.10

| | During Acceleration or Constant Velocity Travel | During Deceleration |
|---|---|---|
| Front Wheel 1st Servo Amplifier | Reduced Follow-up PI Control + Velocity Control | PI Control + Velocity Control |
| Front Wheel 2nd Servo Amplifier | Reduced Follow-up PI Control + Torque Control | PI Control + Torque Control |
| Rear Wheel 1st Servo Amplifier | PI Control + Velocity Control | Reduced Follow-up PI Control + Velocity Control |
| Rear Wheel 2nd Servo Amplifier | PI Control + Torque Control | Reduced Follow-up PI Control + Torque Control |

ARTICLE TRANSPORT VEHICLE

BACKGROUND OF THE INVENTION

The present invention relates to article transport vehicles.

Conventional article transport vehicles perform a transfer of articles using travel control means that actuates a drive motor to rotatively drive a pair of front and rear travel wheels in order to move a vehicle body along a travel rail, for example, up to a target article transferring location.

In one such conventional article transport vehicle, the front and rear travel wheels each are provided with a single drive motor, and the vehicle body is moved by rotatively driving the front wheel on the front side and the rear wheel on the rear side of the vehicle body (see JP 2001-240213A, for example).

Compared to article transport vehicles in which only one of the front and rear travel wheels is rotatively driven by a drive motor, the article transport vehicle disclosed by the above patent document attains a larger drive force because the front and rear travel wheels are both rotatively driven by a drive motor, and thus the article transport vehicle can be moved faster, reducing the time necessary for transporting articles.

When an article transport vehicle has a plurality of drive motors, in practice it is difficult for those drive motors to rotate the corresponding wheels in exactly the same manner, and thus it is difficult to improve travel efficiency by increasing the article transport vehicle velocity, for example. That is, communication delays when specifying the target travel velocity, for example, or manufacturing errors between drive motors, for example, prevent the same operation from being obtained even if the plurality of drive motors are controlled in the same manner, and this causes differences in operation between the drive motors and leads to the plurality of drive motors interfering with one another.

Accordingly, in article transport vehicles having a plurality of drive motors, there is a need for a design that would solve or at least alleviate this problem.

SUMMARY OF THE INVENTION

In light of the foregoing problem, an article transport vehicle, comprising: a vehicle body; a first wheel that supports the vehicle body; a second wheel that is disposed spaced apart from the first wheel in a fore-and-aft direction, and that supports the vehicle body; a first drive motor capable of driving the first wheel; a second drive motor capable of driving the first wheel; velocity detection means for obtaining information necessary for obtaining a velocity of the vehicle body; and control means for controlling the first and the second drive motors. The control means performs a first travel velocity control with respect to the first drive motor so as to control the first drive motor based on a difference between a target travel velocity and a travel velocity based on a detection by the velocity detection means, and performs a first conflict suppress control with respect to the second drive motor so as to control the second drive motor to reduce conflict with driving of the first wheel by the first travel velocity control.

According to the present invention, the travel control means not only drives a single wheel with a plurality of drive motors, but also performs travel velocity control with respect to one of the drive motors and performs conflict suppress control with respect to the other drive motors, and thus it is possible to reduce interference between the plurality of drive motors and thereby allow more efficient movement of the article transport vehicle.

BRIEF DESCRIPTION OF THE DRAWINGS

FIG. 9 is a diagram showing a travel pattern.

FIG. 10 is a table showing the control state of the plurality of drive motors.

DETAILED DESCRIPTION OF THE PREFERRED EMBODIMENTS

Hereinafter, embodiments of an article transport vehicle according to the present invention are described with reference to the drawings. The term “fore-and-aft direction” is used throughout the specification to indicate a direction along the travel direction of the vehicle 3.

Figure 1:
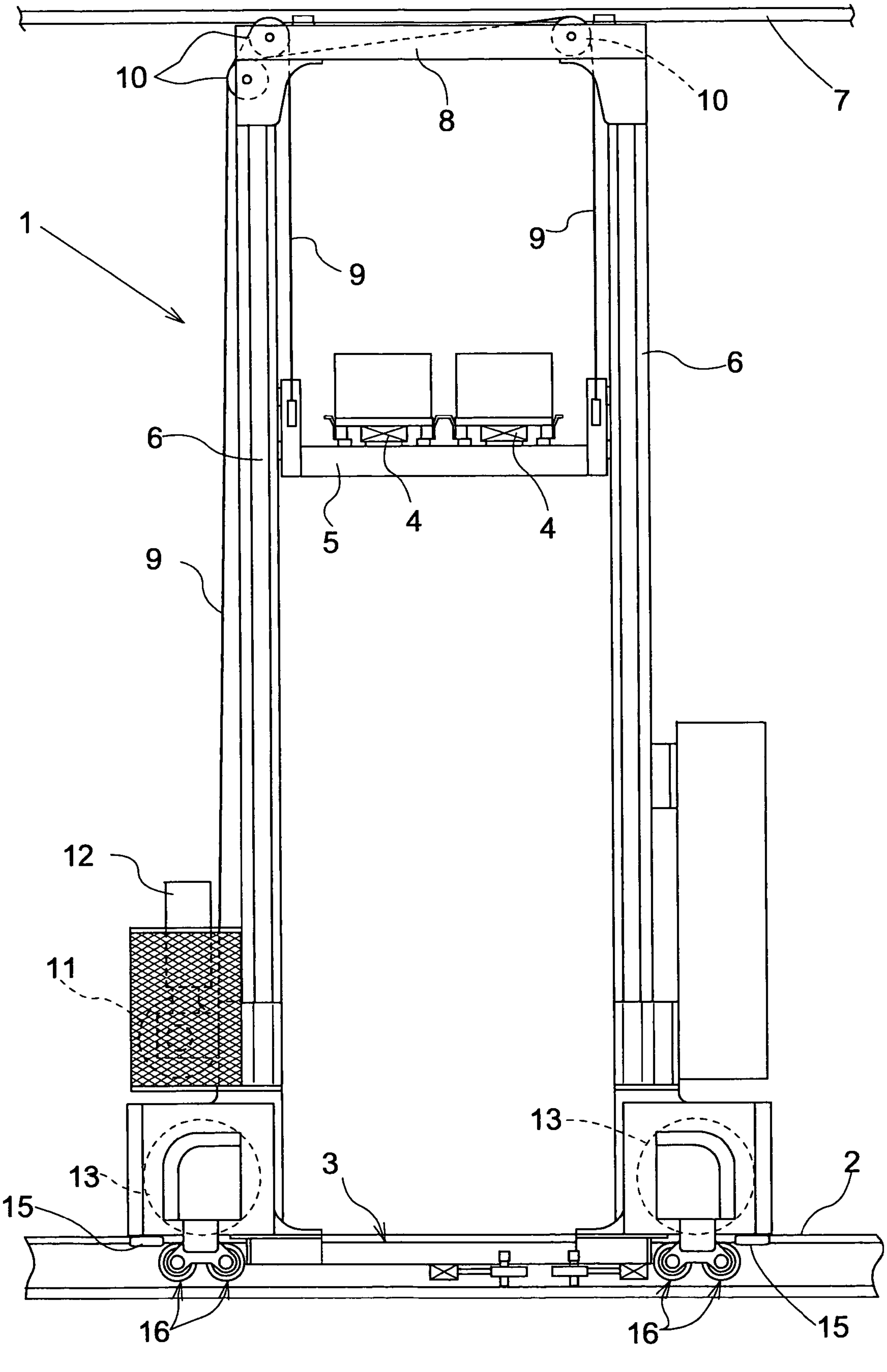
FIG. 1 is a lateral view of a stacker crane.

The article transport vehicle is a stacker crane 1 that automatically travels over a movement path formed between two storage racks extending parallel to one another. As shown in FIG. 1, the movement path is defined by a travel rail 2 disposed on a floor surface.

The stacker crane 1 is provided with a travel vehicle 3 that serves as a vehicle body that can freely travel along the travel rail 2, and a vertically movable platform 5 that is provided with a fork device 4 that can transfer articles.

The stacker crane 1 is configured so that by moving the travel vehicle 3, raising and lowering the vertically movable platform 5, and actuating the fork device 4, articles are transferred between a placing platform disposed at an end portion of the storage rack and a storage portion of the storage rack.

A pair of front and rear vertical masts 6 support the vertically movable platform 5 while guiding the vertically movable platform 5 in such a manner that it can be raised and lowered are provided, and the vertically movable platform 5 is provided in such a manner that it can be raised and lowered with respect to the travel vehicle 3.

The upper end portions of the front and rear vertical masts 6 are connected through an upper frame 8 that is guided along a guide rail 7.

The vertically movable platform 5 is suspendingly supported by two vertically moving wires 9. As for the vertically moving wires 9, each end is connected to the respective end portion in longitudinal direction of the vertically movable platform 5, and their intermediate portions are wound over driven sheaves 10 provided on the upper frame 8. Each of other ends is connected to a winding drum 11 supported by one of the front and rear vertical masts 6.

An electric motor 12 that rotatively drives the winding drum 11 is provided, and by the electric motor 12 rotatively driving the winding drum 11 forward and in reverse, the vertically moving wires 9 are wound out and wound in, thereby raising and lowering the vertically movable platform 5.

Figure 2:
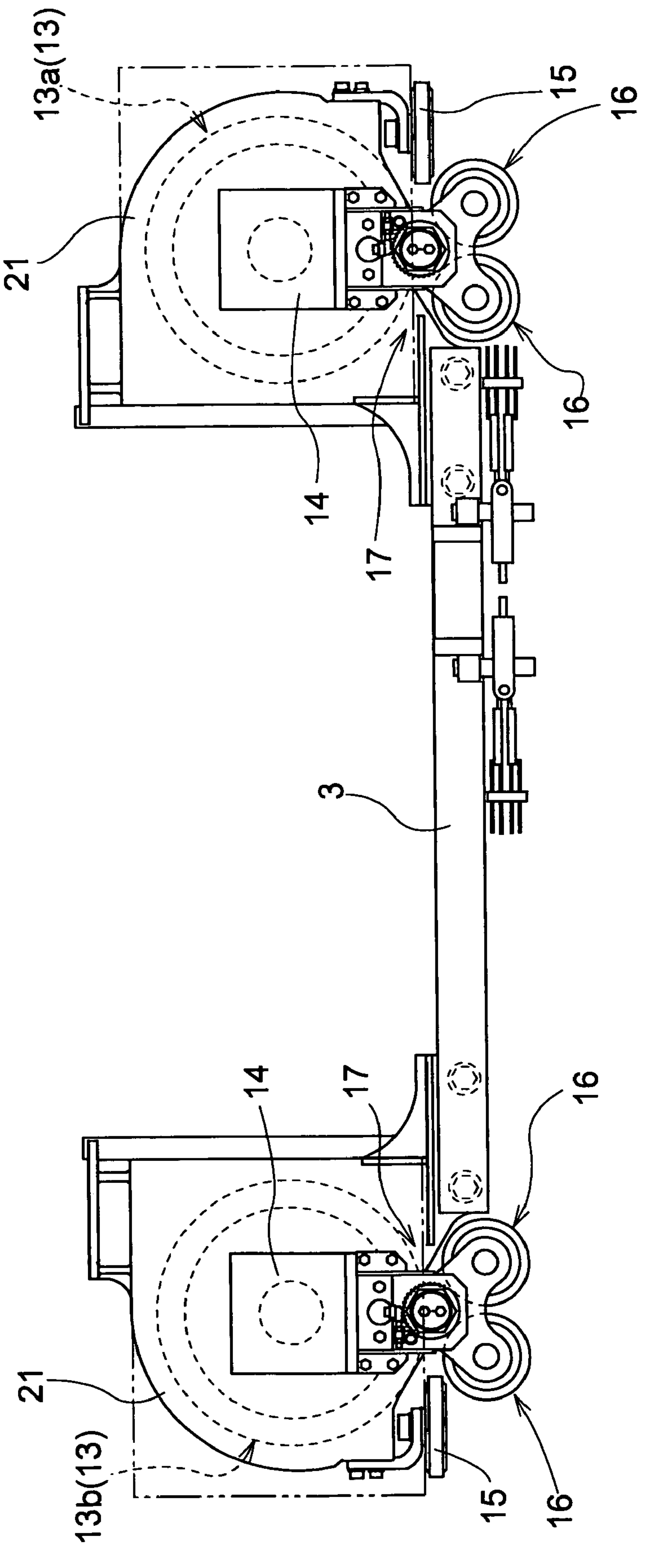
FIG. 2 is a lateral view of a travel vehicle.
Figure 3:
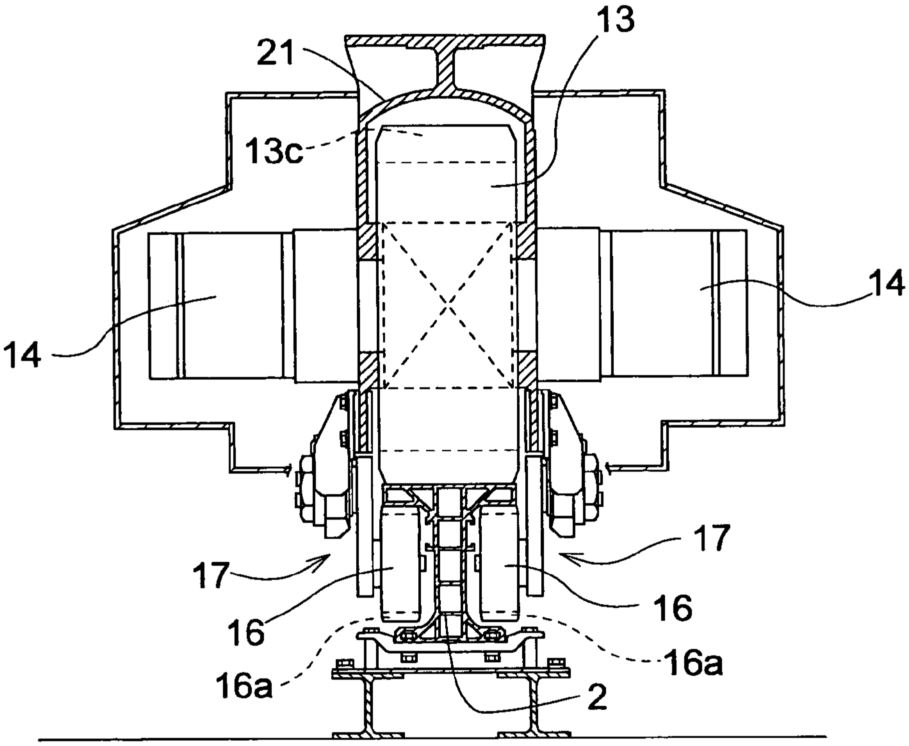
FIG. 3 is a vertical section of the travel vehicle viewed in the fore-and-aft direction.
Figure 4:
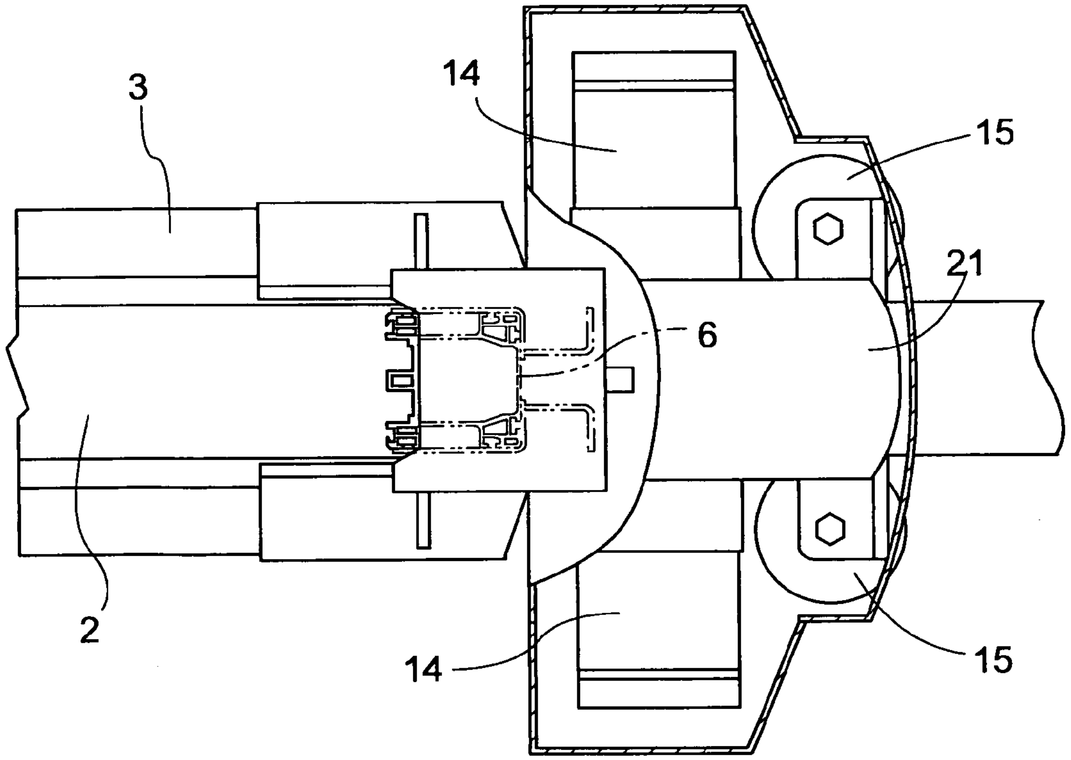
FIG. 4 is a horizontal section of the travel vehicle in plan view.

As shown in FIGS. 2 to 4, the travel vehicle 3 is provided with a pair of front and rear travel wheels 13 that are capable of traveling over the travel rail 2, each provided with two drive motors 14, which are servo motors, so that one travel wheel 13 is rotatively driven by two drive motors 14.

Here it should be noted that FIG. 2 is a lateral view of the travel vehicle 3, FIG. 3 is a vertical section in the fore-and-aft direction of the travel vehicle 3, and FIG. 4 is a horizontal section of the travel vehicle 3 in plan view.

When the right side in FIG. 2 is taken as the front side of the travel vehicle 3, a front wheel 13*a* of the travel wheels 13 and the two drive motors 14 for rotatively driving the front wheel 13*a* are incorporated into a single unit by a support frame 21 on the front end side of the travel vehicle 3, and a rear wheel 13*b* of the travel wheels 13 and the two drive motors 14 for rotatively driving the rear wheel 13*b* are similarly incorporated into a single unit by a support frame 21 on the rear end side of the travel vehicle 3.

The front wheel 13*a* and the rear wheel 13*b* have the same configuration, and as shown in FIG. 3, the two drive motors 14 are provided positioned on the left and right sides of the travel wheel 13, and the drive shafts of the drive motors 14 and the travel wheels 13 have the same rotation axis.

In this manner, one travel wheel 13 is rotatively driven by two drive motors 14, and although not shown, each of the front and rear travel wheels 13 is provided with a deceleration device and a braking device, which arrangements are known from the conventional art.

Each of the pair of front and rear travel wheels 13 is provided with guide wheels 15, which can rotate about a vertical axis and which contact the travel rail 2 in a manner that restricts lateral movement so as to guide the travel vehicle 3 along the travel rail 2, and restriction wheels 16, which can rotate about a horizontal axis and which contact the travel rail 2 in a manner that restricts upward movement so as to restrict the travel wheel 13 from floating off the travel rail 2.

As shown in FIG. 3, an annular travel tire 13*c*, which is an elastic member made of urethane rubber, is attached to the outer circumferential portion of the travel wheel 13, and annular restriction tires 16*a*, which are elastic members made of urethane rubber, are attached to the outer circumferential portion of the restriction wheels 16.

Figure 5:
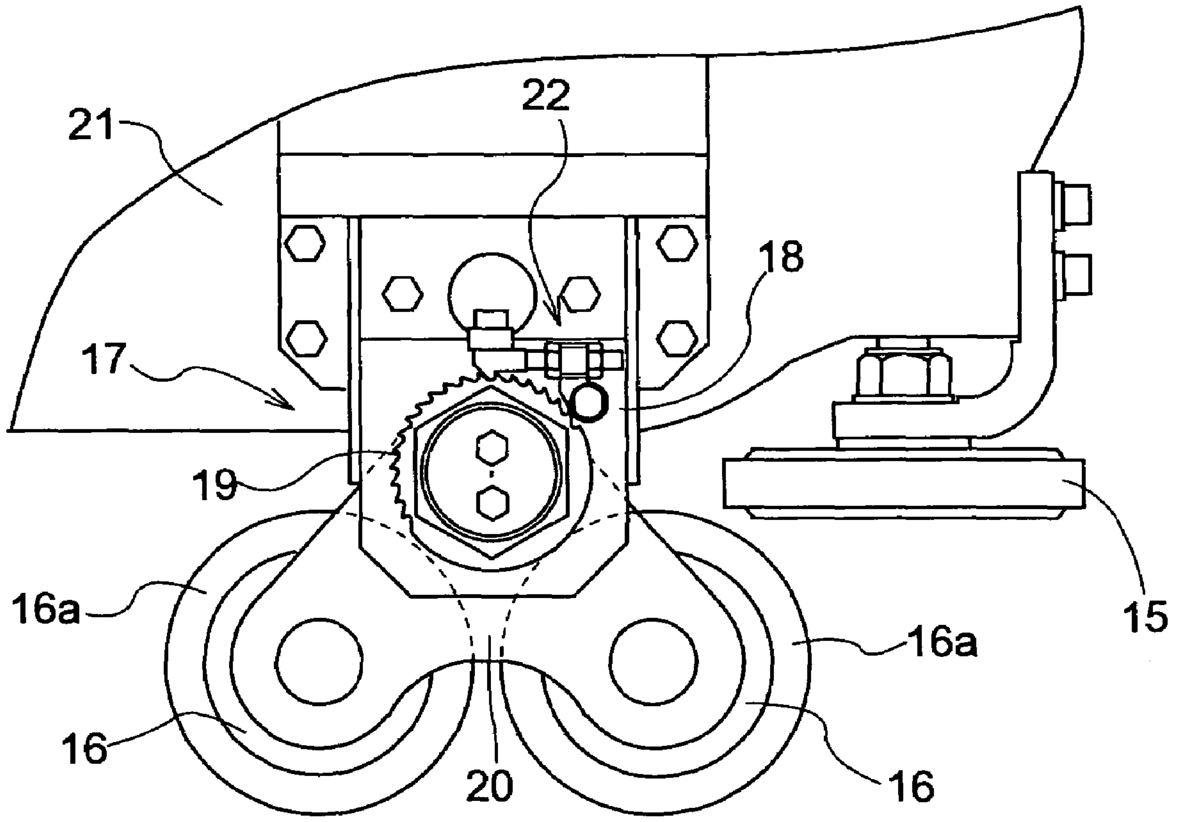
FIG. 5 is a lateral view in which the main components of the travel vehicle have been enlarged.

As shown in FIG. 5, which is an enlarged lateral view, the restriction wheels 16 are supported in such a manner that they can be raised and lowered with respect to the support frame 21, and are provided with adjustment means 17 for adjusting a contact pressure applied by the restriction wheels 16 to the travel rail 2 so as to elastically deform the restriction tires 16*a*.

The adjustment means 17 is made of an operation member 19 that is supported by a base holder 18, which is fixedly supported by the support frame 21, in a manner that allows rotation about a horizontal axis, and a support member 20 that is fitted into and supported by the operation member 19.

Figure 6:
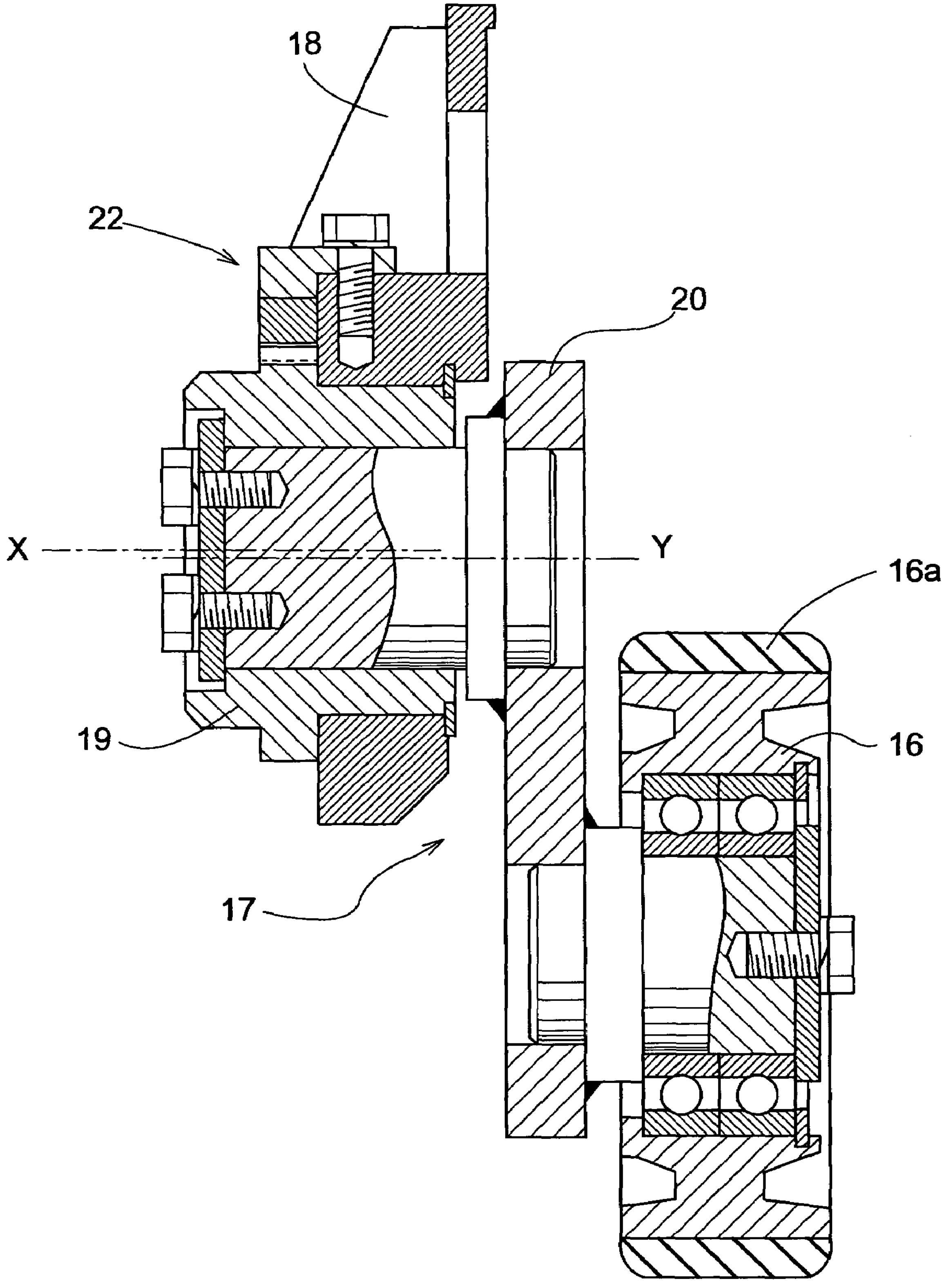
FIG. 6 is a vertical section in the fore-and-aft direction, in which the main components of the travel vehicle have been enlarged.

As shown in FIG. 6, which is a vertical section viewed in the fore-and-aft direction, the support member 20 supports the restriction wheel 16 through bearings in such a manner that the restriction wheel 16 can rotate about a horizontal axis, and it is supported in such a manner that it can pivot about a pivot axis Y that is not coaxial with the rotation axis X of the operation member 19, and the adjustment means 17 is made of leveraging adjustment means constituted by an eccentric cam mechanism.

When the operation members 19 are rotated about the rotation axis X, the weight of the restriction wheels 16 and their abutting against the travel rail 2 causes the support members 20 to pivot about the pivot axis Y while rotating about the rotation axis X, thereby raising and lowering the support members 20 with respect to the travel vehicle 3 while maintaining the orientation of the support members 20.

When the operation members 19 are rotated about the rotation axis X to adjust the vertical position of the support members 20, the contact pressure with which the restriction wheels 16 contact the travel rail 2 is adjusted.

The adjustment means 17 is also provided with lock means 22 that can switch between a fastened state where rotation of the operation member 19 is locked and an unfastened state in which this lock on rotation is released.

The lock means 22 is not shown in detail and a detailed description thereof is omitted, but its configuration is such that it switches to the fixed state by engaging its engaging portions with engaged portions formed at a set spacing in the circumferential direction in the outer circumferential portion of the operation members 19, and switches to the unfastened state by releasing this engagement between the engaging portions and the engaged portions.

The stacker crane 1 is provided with a laser vertical range finder 23 for detecting the vertical position of the vertically movable platform 5, and a laser travel range finder 24 (velocity detection means) for detecting the travel position of the travel vehicle 3.

The laser vertical range finder 23 (not shown) is configured so as to detect the vertical position of the vertically movable platform 5 by emitting and receiving light using a mirror, for example, to detect the distance between the lower face portion of the vertically movable platform 5 and the upper face portion of the travel vehicle 3, which serves as a reference position.

The laser travel range finder 24 (not shown) is configured so as to detect the travel position of the travel vehicle 3 by emitting and receiving light using a reflection plate, for example, to detect the distance between the travel vehicle 3 and an end portion of the travel path, which serves as a reference position.

Figure 7:
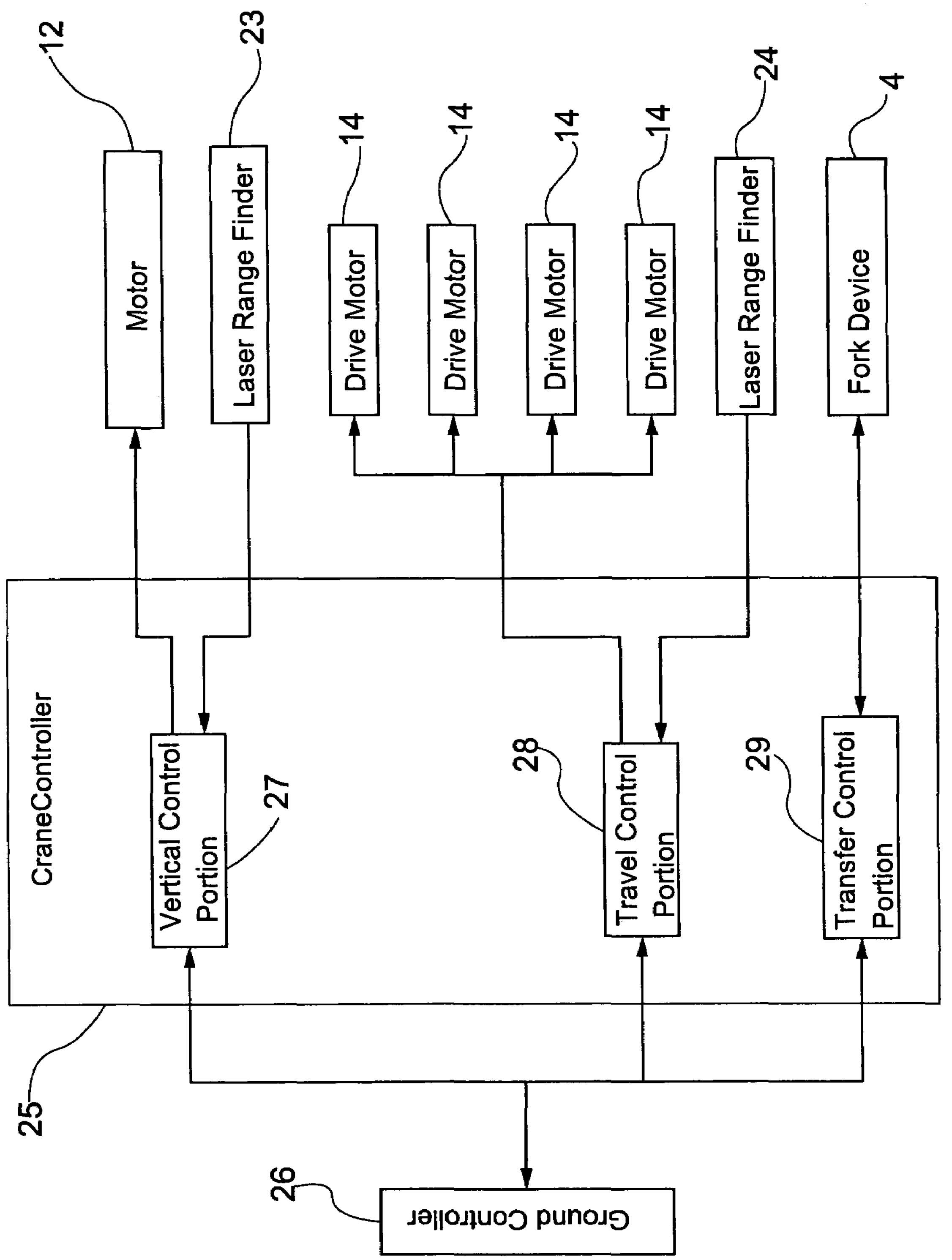
FIG. 7 is a control block diagram of the stacker crane.

As shown in FIG. 7, the stacker crane 1 is provided with a crane controller 25 that receives commands from a ground-side controller 26 and based on these controls the operation of the stacker crane 1, and information detected by the laser vertical range finder 23 and information detected by the laser travel range finder 24 are input into the crane controller 25.

The crane controller 25 receives commands that specify a target height or a target horizontal position, for example, from the ground-side controller 26, and is for example made of a vertical movement control portion 27 for raising and lowering the vertically movable platform 5 to a target height based on the information detected by the laser vertical range finder 23, a travel control portion 28 serving as travel control means that moves the travel vehicle 3 to a target horizontal position based on the information detected by the laser travel range finder 24, and a transfer control portion 29 that actuates the fork device 4 to transfer an article when the vertically movable platform 5 has been stopped at the target height and the travel vehicle 3 has been stopped at the target horizontal position.

The travel control portion 28 is described below.

Figure 8:
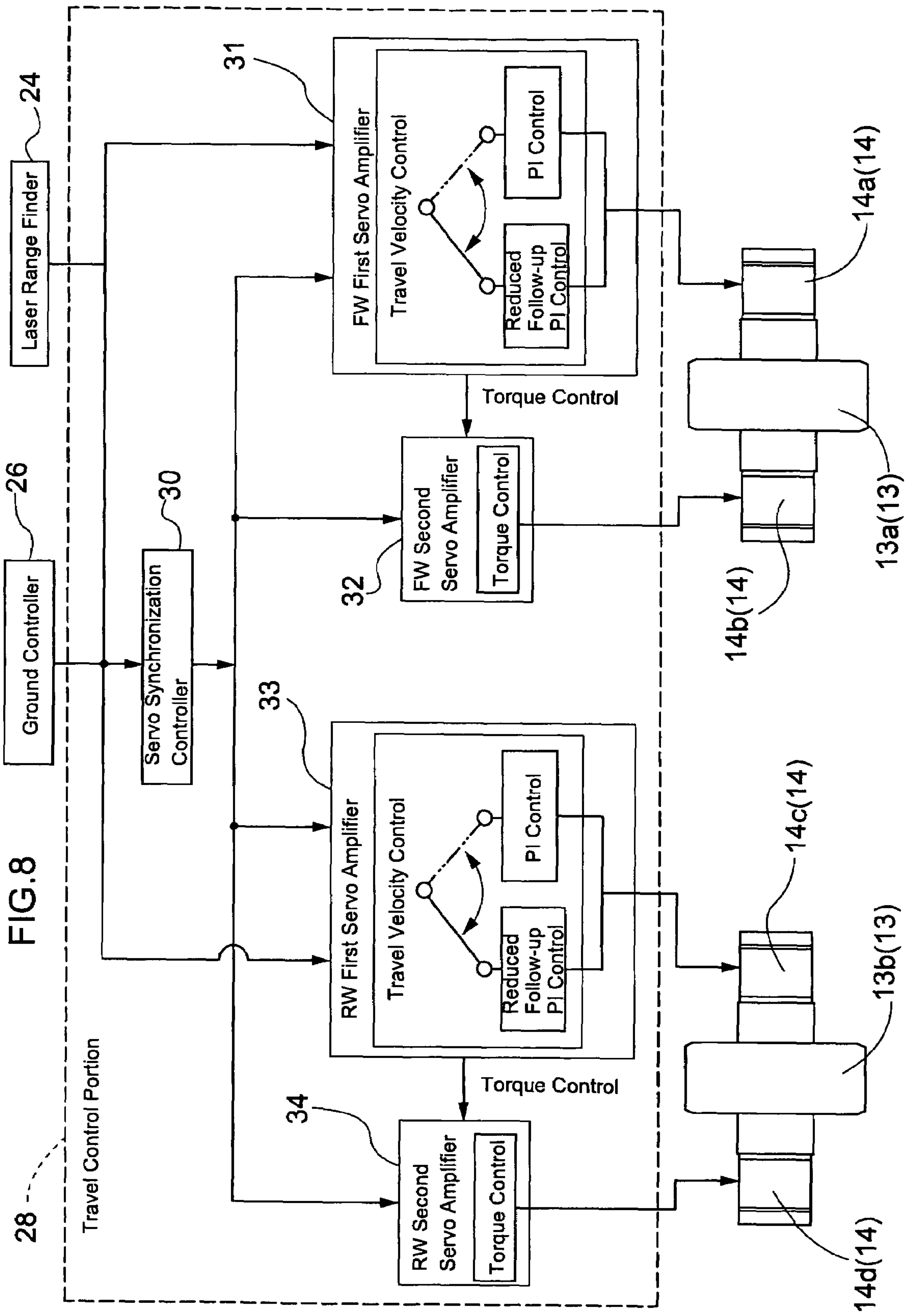
FIG. 8 is a control block diagram of a travel control portion.

As shown in FIG. 8, the travel control portion 28 is for example made of a servo synchronization controller 30 that receives a command for a target horizontal position from the ground-side controller 26, a front wheel first servo amplifier 31 for controlling the operation of a front wheel first drive motor 14*a* that is provided on the right side of the front wheel 13*a*, a front wheel second servo amplifier 32 for controlling the operation of a front wheel second drive motor 14*b* that is provided on the left side of the front wheel 13*a*, a rear wheel first servo amplifier 33 for controlling the operation of a rear wheel first drive motor 14*c* that is provided on the right side of the rear wheel 13*b*, and a rear wheel second servo amplifier 34 for controlling the operation of a rear wheel second drive motor 14*d* that is provided on the left side of the rear wheel 13*b*.

The servo synchronization controller 30 finds a travel pattern, as shown in FIG. 9, based on the travel distance between the current position of the travel vehicle 3, which is detected by the laser travel range finder 24, and the target horizontal position.

To describe the travel pattern, when moving the travel vehicle 3, the travel vehicle 3 is moved and stopped in the following manner. First, the travel vehicle 3 is put into an acceleration state where it accelerates up to a maximum velocity and then transitions to a constant velocity state where it moves at a constant travel velocity at the maximum velocity, after which it transitions to a deceleration state where its travel velocity is lowered from the maximum velocity to a low velocity for stopping, and then it transitions to a creeping state where it moves at a constant travel velocity at the low velocity for stopping.

The maximum velocity, the low velocity for stopping, and the acceleration/deceleration value $\Delta\alpha$ are set in advance, and thus the travel pattern shown in FIG. 9 is obtained by finding the timing at which the maximum velocity is reached and the timing at which the velocity should be lowered to the low velocity for stopping, based on the travel distance.

The servo synchronization controller 30 sends travel velocity command information specifying a target travel velocity in accordance with the travel pattern, to the front wheel first servo amplifier 31, the front wheel second servo amplifier 32, the rear wheel first servo amplifier 33, and the rear wheel second servo amplifier 34.

First, rotative driving of the front wheel 13*a* is described. The front wheel first servo amplifier 31 performs travel velocity control to actuate the front wheel first drive motor 14*a* based on the difference between the travel velocity obtained from the travel position that is detected by the laser travel range finder 24 and the target travel velocity obtained from the servo synchronization controller 30.

To describe the travel velocity control, the front wheel first servo amplifier 31 finds the torque command value with which the difference between the travel velocity found from the travel position detected by the laser travel range finder 24 and the target travel velocity becomes zero, and imparts current that corresponds to this torque to rotatively drive the front wheel first drive motor 14*a*.

The front wheel first servo amplifier 31 performs a torque command for imparting the torque command value that has been found to the front wheel second servo amplifier 32.

The front wheel second servo amplifier 32 performs conflict suppress control for actuating the front wheel second drive motor 14*b* in such a manner that it is prevented from interfering with the rotative driving of the front wheel 13*a* by the front wheel first drive motor 14*a*, which performs travel velocity control.

As conflict suppress control, the front wheel second servo amplifier 32 performs torque control for actuating the front wheel second drive motor 14*b* based on the target torque of the front wheel first drive motor 14*a* in the travel velocity control.

To describe torque control, the front wheel second servo amplifier 32 rotatively drives the front wheel second drive motor 14*b* by imparting current that corresponds to the torque of the torque command value that is specified in the torque command from the front wheel first servo amplifier 31.

Rotative driving of the rear wheel 13*b* is the same as for the front wheel 13*a*, and thus is not described in detail. Here, the rear wheel first servo amplifier 33 performs travel velocity control, and the rear wheel second servo amplifier 34 performs torque control as the conflict suppress control.

The travel control portion 28 does not control the front wheel 13*a* and the rear wheel 13*b* in the same manner. Instead, for the wheel of the front wheel 13*a* and the rear wheel 13*b* to which a heavier weight is applied by the travel vehicle 3 (hereinafter this is referred to as "wheel load"), it performs a wheel load travel velocity control to actuate the drive motors 14 based on the difference between the travel velocity found from the travel position detected by the laser travel range finder 24 and the target travel velocity, and for the wheel having the lighter wheel load, it performs a wheel load conflict suppress control to control or actuate the drive motors 14 to reduce conflict with the rotative driving of the travel wheel 13 having the heaver wheel load.

As the wheel load travel velocity control, the travel control portion 28 performs proportional integral control, with which proportional control and integral control are performed based on the difference between the target travel velocity and the travel velocity found from the travel position detected by the laser travel range finder 24.

Further, as wheel load conflict suppress control, the travel control portion 28 performs reduced follow-up proportional integral control, which is control for performing the proportional control and the integral control based on the difference between the target travel velocity and the travel velocity found from the travel position detected by the laser travel range finder 24, in a state of lower follow-up properties with respect to the travel velocity than in the proportional integral control.

More specifically, when the travel vehicle 3 is traveling forward in the acceleration state or the constant-velocity state, the rear wheel 13*b* is the wheel with the heavier wheel load and the front wheel 13*a* is the wheel with the lighter wheel load, and when the travel vehicle 3 is traveling forward in the deceleration state, the front wheel 13*a* is the wheel with the heavier wheel load and the rear wheel 13*b* is the wheel with the lighter wheel load.

The servo synchronization controller 30 sends travel velocity command information to the front wheel first servo amplifier 31 and the rear wheel first servo amplifier 33 to indicate whether the travel vehicle 3, when moving forward, is in the acceleration state and the constant-velocity state, or is in the deceleration state, based on the travel pattern.

The front wheel first servo amplifier 31 and the rear wheel first servo amplifier 33 can switch between performing proportional integral control as the wheel load travel velocity control and performing reduced follow-up proportional integral control as the wheel load conflict suppress control, based on the travel velocity command information from the servo synchronization controller 30.

The front wheel first servo amplifier 31 and the front wheel second servo amplifier 32 perform the reduced follow-up proportional integral control as the wheel load conflict suppress control when the travel velocity command information indicates the acceleration state or the constant-velocity state, and perform proportional integral control as the wheel load travel velocity control when the travel velocity command information indicates the deceleration state.

Conversely, the rear wheel first servo amplifier 33 and the rear wheel second servo amplifier 34 perform proportional integral control as the wheel load travel velocity control when the travel velocity command information indicates the acceleration state or the constant-velocity state, and perform reduced follow-up proportional integral control as the wheel load conflict suppress control when the travel velocity command information indicates the deceleration state.

To describe proportional integral control more specifically, the front wheel first servo amplifier 31 and the rear wheel first servo amplifier 33 find the torque command value through proportional control and integral control with which the deviation between the travel velocity found from the travel position detected by the laser travel range finder 24 and the target travel velocity is zero, and imparts a current that corresponds to that torque to rotatively drive the drive motors 14.

Further, the front wheel first servo amplifier 31 and the rear wheel first servo amplifier 33 give the torque command value in the torque command found proportional integral control, and the front wheel second servo amplifier 32 and the rear wheel second servo amplifier 34 perform torque control in the form of proportional integral control, by performing torque control based on the torque command value found through proportional integral control.

To describe the reduced follow-up proportional integral control more specifically, the front wheel first servo amplifier 31 and the rear wheel first servo amplifier 33 provide a dead band (−β<0<+β, for example) for the deviation between the travel velocity found from the travel position detected by the laser travel range finder 24 and the target travel velocity, find the torque command value based on the deviation through the dead band, and then impart a current that corresponds to this torque in order to rotatively drive the drive motors 14.

If the deviation between the travel velocity and the target travel velocity is within the dead band (−β<0<+β, for example), then with that deviation regarded as zero, the torque command value is found through proportional control and integral control. If the deviation between the travel velocity and the target travel velocity is outside the dead band (−β<0<+β, for example), then the torque command value is found through proportional control and integral control so that the deviation becomes zero.

Further, the front wheel first servo amplifier 31 and the rear wheel first servo amplifier 33 are configured so as to give the torque command value found through reduced follow-up proportional integral control in the torque command, and the front wheel second servo amplifier 32 and the rear wheel second servo amplifier 34 are configured so as to perform torque control in the form of reduced follow-up proportional integral control, by performing torque control based on the torque command value found through proportional control and integral control.

In this manner, as shown in the table of FIG. 10, the travel control portion 28 is configured such that in the acceleration state and the constant-velocity state during forward movement, the front wheel first servo amplifier 31 performs reduced follow-up proportional integral control and travel velocity control, the front wheel second servo amplifier 32 performs reduced follow-up proportional integral control and torque control, the rear wheel first servo amplifier 33 performs proportional integral control and travel velocity control, and the rear wheel second servo amplifier 34 performs proportional integral control and torque control.

When the travel control portion 28 is in the deceleration state while moving forward, the front wheel first servo amplifier 31 performs proportional integral control and travel velocity control, the front wheel second servo amplifier 32 performs proportional integral control and torque control, the rear wheel first servo amplifier 33 performs reduced follow-up proportional integral control and travel velocity control, and the rear wheel second servo amplifier 34 performs reduced follow-up proportional integral control and torque control.

The configuration of the stacker crane 1 is such that it can move back and forth over the travel rail 2, and the configuration of the travel control portion 28 is such that during forward movement it controls the operation of the four drive motors 14 as described above in accordance with the table in FIG. 10, and during rearward movement it controls the operation of the four drive motors 14 by reversing the control mode for the front wheel 13*a* and the rear wheel 13*b*.

Other Embodiments (1) In the foregoing embodiment, the travel control portion 28 is configured such that it performs torque control as the conflict suppress control, but it is also possible to adopt a configuration in which the travel control portion 28 performs reduced follow-up travel velocity control as the conflict suppress control, in which the drive motors 14 are actuated based on the difference between the target travel velocity and the travel velocity found from the travel position detected by the laser travel range finder 24, in a state where the follow-up properties with respect to the travel velocity are lower than in travel velocity control.

(2) In the foregoing embodiment, the travel control portion 28, for each of the pair of front and rear travel wheels 13, performs travel velocity control with respect to one drive motor 14 and performs torque control as the conflict suppress control with respect to the other drive motor 14, but the specifics of which control is performed as travel velocity control and conflict suppress control can be suitably changed.

For example, it is possible to perform proportional integral control as the travel velocity control and perform reduced follow-up proportional integral control as the conflict suppress control. Alternatively, it is also possible to perform proportional integral differential control, in which proportional control, integral control, and differential control are performed based on the difference between the target travel velocity and the travel velocity found from the travel position detected by the laser travel range finder 24, as the travel velocity control, and to perform proportional integral control as the conflict suppress control.

(3) In the foregoing embodiment, the travel control portion 28 performs proportional integral control as the wheel load travel velocity control and performs reduced follow-up proportional integral control as the wheel load conflict suppress control, but the specifics of which control is performed as the wheel load travel velocity control and the wheel load conflict suppress control can be changed where appropriate.

For example, it is possible to perform travel velocity control as the wheel load travel velocity control and perform torque control as the wheel load conflict suppress control. Alternatively, as described above in Other Embodiments (2), it is also possible to perform proportional integral differential control as the wheel load travel velocity control, and to perform proportional integral control as the wheel load conflict suppress control.

(4) In the foregoing embodiment, the travel control portion 28 controls the operation of the four drive motors 14 in accordance with the table in FIG. 10, but specifically which control is to be performed for travel velocity control, conflict suppress control, wheel load travel velocity control, and wheel load conflict suppress control can be suitably altered as described above in Other Embodiments (2) and (3), and thus specifically which control the travel control portion 28 performs for each of the four drive motors 14 can be suitably changed.

For example, the travel control portion 28 can control the operation of the four drive motors 14 by performing proportional integral differential control as the travel velocity control, performing proportional integral control as the conflict suppress control, performing travel velocity control as the wheel load travel velocity control, and performing torque control as the wheel load conflict suppress control.

(5) In the foregoing embodiment, two drive motors 14 are provided for each of the front and rear travel wheels 13, but it is also possible for the number of the drive motors 14 to be three or more.

When there are three or more drive motors 14, it is possible to assign priorities to the drive motors 14, and based on those priorities, to actuate the drive motors 14 in such a manner that a drive motor with lower priority does not interfere with driving of the travel wheel 13 by a drive motor 14 with a higher priority.

(6) In the foregoing embodiment, the laser travel range finder 24 is provided as the velocity detection means and detects the travel position of the travel vehicle 3. However, it is also possible to adopt a configuration in which the travel vehicle 3 is provided with a rotary encoder as the velocity detection means in place of the laser travel range finder 24, in which a sprocket that meshes with a chain provided along the travel rail 2 is provided in the rotation shaft of the rotary encoder and rotates in response to movement by the travel vehicle 3, detecting the travel distance of the travel vehicle 3 from the reference position and thereby detecting the travel position.

What is claimed is:

1. An article transport vehicle, comprising:

a vehicle body;

a first wheel that supports the vehicle body;

a second wheel that is disposed spaced apart from the first wheel in a fore-and-aft direction, and that supports the vehicle body;

a first drive motor capable of driving the first wheel;

a second drive motor capable of driving the first wheel;

velocity detection means for obtaining information necessary for obtaining a velocity of the vehicle body; and control means for controlling the first and the second drive motors;

wherein the control means performs a first travel velocity control with respect to the first drive motor so as to control the first drive motor based on a difference between a target travel velocity determined by a predetermined travel pattern and a travel velocity based on a detection by the velocity detection means, and performs a first conflict suppress control with respect to the second drive motor so as to control the second drive motor to reduce conflict with driving of the first wheel by the first travel velocity control.

2. The article transport vehicle according to claim 1, further comprising:

a third drive motor capable of driving the second wheel; and a fourth drive motor capable of driving the second wheel;

wherein the control means controls the third and the fourth drive motors; and wherein the control means performs the first travel velocity control with respect to the third drive motor, and performs the first conflict suppress control with respect to the fourth drive motor so as to control the fourth drive motor to reduce conflict with driving of the second wheel by the first travel velocity control.

3. The article transport vehicle according to claim 2, wherein the first conflict suppress control performed by the control means with respect to the fourth drive motor is torque control in which the fourth drive motor is controlled based on a target torque of the third drive motor in the first travel velocity control.

4. The article transport vehicle according to claim 2, wherein the first conflict suppress control performed by the control means with respect to the fourth drive motor is a reduced follow-up travel velocity control in which the fourth drive motor is controlled based on a difference between a target travel velocity and a travel velocity determined based on a detection by the velocity detection means, in a manner in which follow-up properties with respect to the travel velocity are lower than in the first travel velocity control.

5. The article transport vehicle according to claim 2, wherein when a weight that is applied to the first wheel is greater than a weight that is applied to the second wheel, the control means performs a second travel velocity control with respect to at least one of the first and the second drive motors, in which that wheel is controlled based on a difference between a target travel velocity and a travel velocity determined based on a detection by the velocity detection means, and performs a second conflict suppress control with respect to at least one of the third and the fourth drive motors, in which the at least one of the third and the fourth drive motors is actuated in a manner in which interference with the driving of the at least one of the first and the second drive motors is reduced.

6. The article transport vehicle according to claim 5, wherein when a weight that is applied to the first wheel is less than a weight that is applied to the second wheel, the control means performs a second travel velocity control with respect to at least one of the third and the fourth drive motors, in which that wheel is controlled based on a difference between a target travel velocity and a travel velocity determined based on a detection by the velocity detection means, and performs a second conflict suppress control with respect to at least one of the first and the second drive motors, in which the at least one of the first and the second drive motors is actuated in a manner in which interference with the driving of the at least one of the third and the fourth drive motors is reduced.

7. The article transport vehicle according to claim 5, wherein the second travel velocity control is a proportional integral control in which proportional control and integral control are performed based on a difference between a target travel velocity and a travel velocity determined based on a detection by the velocity detection means, and the second conflict suppress control is a reduced follow-up proportional integral control in which proportional control and integral control are performed based on a difference between a target travel velocity and a travel velocity determined based on a detection by the velocity detection means, in a manner in which the follow-up properties with respect to the travel velocity are lower than in the proportional integral control.

8. The article transport vehicle according to claim 1, wherein the first drive motor is disposed on either the left side or the right side of the first wheel, and the second drive motor is disposed on the other side of the first wheel.

9. The article transport vehicle according to claim 2, wherein the third drive motor is disposed on either the left side or the right side of the second wheel, and the fourth drive motor is disposed on the other side of the second wheel.

10. An article transport vehicle, comprising:

a vehicle body;

a first wheel that supports the vehicle body;

a second wheel that is disposed spaced apart from the first wheel in a fore-and-aft direction, and that supports the vehicle body;

a first drive motor capable of driving the first wheel;

a second drive motor capable of driving the first wheel;

velocity detection means for obtaining information necessary for obtaining a velocity of the vehicle body; and control means for controlling the first and the second drive motors;

wherein the control means performs a first travel velocity control with respect to the first drive motor so as to control the first drive motor based on a difference between a target travel velocity and a travel velocity based on a detection by the velocity detection means, and performs a first conflict suppress control with respect to the second drive motor so as to control the second drive motor to reduce conflict with driving of the first wheel by the first travel velocity control; and wherein the first conflict suppress control that is performed by the control means with respect to the second drive motor is torque control in which the second drive motor is controlled based on a target torque of the first drive motor in the first travel velocity control.

11. An article transport vehicle, comprising:

a vehicle body;

a first wheel that supports the vehicle body;

a second wheel that is disposed spaced apart from the first wheel in a fore-and-aft direction, and that supports the vehicle body;

a first drive motor capable of driving the first wheel;

a second drive motor capable of driving the first wheel;

velocity detection means for obtaining information necessary for obtaining a velocity of the vehicle body; and control means for controlling the first and the second drive motors;

wherein the control means performs a first travel velocity control with respect to the first drive motor so as to control the first drive motor based on a difference between a target travel velocity and a travel velocity based on a detection by the velocity detection means, and performs a first conflict suppress control with respect to the second drive motor so as to control the second drive motor to reduce conflict with driving of the first wheel by the first travel velocity control; and wherein the first conflict suppress control performed by the control means with respect to the second drive motor is a reduced follow-up travel velocity control in which the second drive motor is controlled based on a difference between a target travel velocity and a travel velocity determined based on a detection by the velocity detection means, in a manner in which follow-up properties with respect to the travel velocity are lower than in the first travel velocity control.

12. An article transport vehicle, comprising:

a vehicle body;

a first wheel that supports the vehicle body;

a second wheel that is disposed spaced apart from the first wheel in a fore-and-aft direction, and that supports the vehicle body;

a first drive motor capable of driving the first wheel;

a second drive motor capable of driving the first wheel;

velocity detection means for obtaining information necessary for obtaining a velocity of the vehicle body; and control means for controlling the first and the second drive motors;

wherein the control means performs a first travel velocity control with respect to the first drive motor so as to control the first drive motor based on a difference between a target travel velocity and a travel velocity based on a detection by the velocity detection means, and performs a first conflict suppress control with respect to the second drive motor so as to control the second drive motor to reduce conflict with driving of the first wheel by the first travel velocity control; and wherein the first wheel and the second wheel travel on a single travel rail; wherein the article transport vehicle further comprises a restriction wheel that contacts the travel rail in a manner that restricts upward movement so as to restrict lifting of the first wheel from the travel rail; and wherein the restriction wheel is provided contacting the travel rail with a contact pressure from an elastic force of an elastic portion.

13. An article transport vehicle, comprising:

a vehicle body;

a support frame mounted to the vehicle body;

a first wheel that supports the vehicle body through the support frame;

a second wheel that is disposed spaced apart from the first wheel in a fore-and-aft direction, and that supports the vehicle body;

a first drive motor attached to the support frame and adapted to independently drive the first wheel;

a second drive motor attached to the support frame and adapted to independently drive the first wheel such that the first wheel, the first drive motor, and the second drive motor are supported to the vehicle body through the support frame;

a velocity sensor for obtaining information necessary for obtaining a velocity of the vehicle body;

a first mast fixed to the vehicle body;

a second mast fixed to the vehicle body, spaced apart from the first mast in a fore-and-aft direction;

a vertically movable platform that is disposed between the first and the second masts, and that can move vertically with respect to the vehicle body; and control means for controlling the first and the second drive motors;

wherein the control means performs a first travel velocity control with respect to the first drive motor so as to control the first drive motor based on a difference between a target travel velocity and a travel velocity determined based on a detection by the velocity sensor, and performs a first conflict suppress control with respect to the second drive motor so as to control the second drive motor to reduce conflict with driving of the first wheel by the first travel velocity control.

14. The article transport vehicle according to claim 13, further comprising:

a third drive motor capable of driving the second wheel; and a fourth drive motor capable of driving the second wheel;

wherein the control means controls the third and the fourth drive motors; and wherein the control means performs the first travel velocity control with respect to the third drive motor, and performs a first conflict suppress control with respect to the fourth drive motor so as to control the fourth drive motor to reduce conflict with driving of the second wheel by the first travel velocity control.

15. The article transport vehicle according to claim 13, wherein the first conflict suppress control that is performed by the control means with respect to the second drive motor is torque control in which the second drive motor is controlled based on a target torque of the first drive motor in the first travel velocity control.

16. The article transport vehicle according to claim 13, wherein the first conflict suppress control performed by the control means with respect to the second drive motor is a reduced follow-up travel velocity control in which the second drive motor is controlled based on a difference between a target travel velocity and a travel velocity determined based on a detection by the velocity detection means, in a manner in which follow-up properties with respect to the travel velocity are lower than in the first travel velocity control.

17. The article transport vehicle according to claim 14, wherein when a weight that is applied to the first wheel is greater than a weight that is applied to the second wheel, the control means performs a second travel velocity control with respect to at least one of the first and the second drive motors, in which that wheel is controlled based on a difference between a target travel velocity and a travel velocity determined based on a detection by the velocity detection means, and performs a second conflict suppress control with respect to at least one of the third and the fourth drive motors, in which the at least one of the third and the fourth drive motors is actuated in a manner in which interference with the driving of the at least one of the first and the second drive motors is reduced.

18. The article transport vehicle according to claim 17, wherein when a weight that is applied to the first wheel is less than a weight that is applied to the second wheel, the control means performs a second travel velocity control with respect to at least one of the third and the fourth drive motors, in which that wheel is controlled based on a difference between a target travel velocity and a travel velocity determined based on a detection by the velocity detection means, and performs a second conflict suppress control with respect to at least one of the first and the second drive motors, in which the at least one of the first and the second drive motors is actuated in a manner in which interference with the driving of the at least one of the third and the fourth drive motors is reduced.

19. The article transport vehicle according to claim 17, wherein the second travel velocity control, is a proportional integral control in which proportional control and integral control are performed based on a difference between a target travel velocity and a travel velocity determined based on a detection by the velocity detection means, and the second conflict suppress control is a reduced follow-up proportional integral control in which proportional control and integral control are performed based on a difference between a target travel velocity and a travel velocity determined based on a detection by the velocity detection means, in a manner in which the follow-up properties with respect to the travel velocity are lower than in proportional integral control.

20. The article transport vehicle according to claim 13, wherein the first wheel and the second wheel travel on a single travel rail;

wherein the article transport vehicle farther comprises a restriction wheel that, contacts the travel rail in a manner that restricts upward movement so as to restrict lifting of the first wheel from the travel rail; and wherein the restriction wheel is provided contacting the travel rail with a contact pressure from an elastic force of an elastic portion.

* * * * *